Sept. 30, 1969  H. R. LORCH ETAL  3,469,307
MINERAL INSULATED ELECTRIC CABLES
Filed Nov. 3, 1965
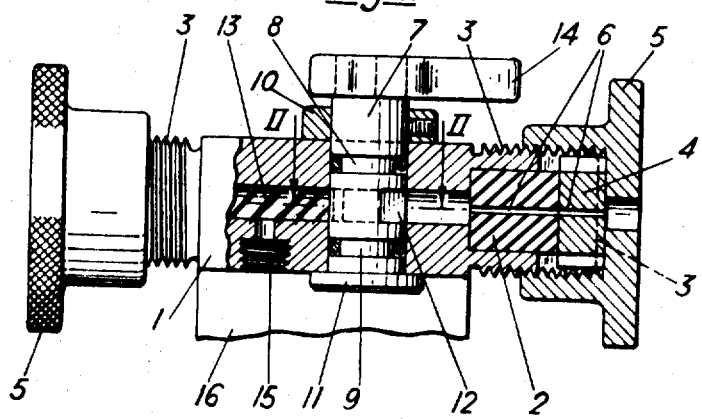
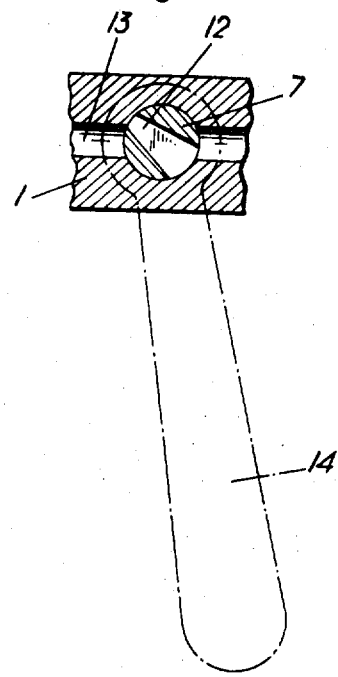
Inventor
HERMANN R. LORCH
Gideon Sorsky
By Webb, Burdew
Robinson + Webb Attorneys United States Patent Office 3,469,307
Patented Sept. 30, 1969

3,469,307
MINERAL INSULATED ELECTRIC CABLES
Hermann Richard Lorch, Southport, and Gideon Sorsky, Liverpool, England, assignors to British Insulated Callender's Cables Limited, London, England, a British company
Filed Nov. 3, 1965, Ser. No. 506,200
Claims priority, application Great Britain, Nov. 6, 1964, 45,340/64
Int. Cl. H01r *43/00;* H05k *13/00*
U.S. Cl. 29—573                       11 Claims

ABSTRACT OF THE DISCLOSURE

A mineral insulated cable is cut for jointing or terminating at a position, judged to be uncontaminated by atmospheric moisture, temporarily hermetically sealed in a chamber which protects the cut end from the atmosphere. Inert gas under pressure passes from the chamber into the cut end to impregnate the mineral insulation and after the cut end has been removed from the chamber the escape of this gas provides an atmosphere that protects the exposed end of the insulation and the exposed conductor or conductors for at least part of the time until the end is capped or otherwise sealed, as in a sealing pot.

---

This invention relates to a method of jointing or terminating mineral insulated electric cables, that is cables having an insulation of compacted mineral powder. The invention is concerned more especially with mineral insulated thermocouple cables and finds its main application in the termination of such cables to form a hot junction. This involves cutting the cable to expose the conductors, jointing the conductors to form the hot junction and sealing the end of the sheath to enclose the hot junction.

An object of the invention is to provide a method of cutting and jointing or terminating mineral insulated cables in which method exposure to the atmosphere of the cut end of the cable is reduced or avoided altogether, both in its freshly cut state and during subsequent preparation, which will usually entail removal of insulation from within the cut sheath of the cable to expose short lengths of the cable conductor or conductors.

In the method in accordance with the invention, after the cable has been cut and before there has been any substantial exposure of the cut end to the atmosphere, the cut end is exposed to an inert gas under a pressure above atmospheric such that the mineral insulation at that end is impregnated with the gas. The preparation of the cable for jointing or termination and, in the case of a hot junction, for interconnection of the two conductors as by welding can now proceed in the normal way while the cut end is protected from contact with the atmosphere, by a local atmosphere of the inert gas created by the gas escaping from the mineral insulation, during at least part of the subsequent jointing or terminating procedure.

The term "inert gas" as used herein means a gas that will not have any substantial detrimental effect on the metals used in the manufacture of the cable. Examples of suitable inert gases are hydrogen and argon.

In our preferred method there is no exposure of the cut end to the atmosphere before the mineral insulation is impregnated with gas. This method comprises sealing a length of the cable in a gas tight chamber, preferably in such a way that the cable passes through the chamber and the part sealed within the chamber is remote from both ends of the cable length; evacuating the chamber; cutting the cable within the chamber; filling the chamber with a dry inert gas at a pressure above atmospheric; and, after a time adequate for sufficient of the gas to be absorbed in the insulation, removing the cut cable from the chamber. An alternative procedure is to fill the chamber with the gas before cutting the cable. When the cut is made in such a way that the length of cable severed from a very much longer length of cable is itself to be used as a thermocouple, the cut will generally be so far from the free end of the cable that atmospheric moisture could not possibly have penetrated as far as the region cut. When however the reason for cutting the cable is merely to trim the end, then care must be taken to cut off a sufficient length of the cable to ensure that atmospheric moisture could not have penetrated as far as the region cut. For an hermetically sealed cable, we consider a distance of 2 inches (5 cm.) to be sufficiently remote from the end, but if the seal is suspected of leakage, we prefer to make the cut at a greater distance, depending on the type and size of cable.

A method of cutting and jointing or terminating a mineral insulated cable in accordance with the invention will hereinafter be described by way of example with reference to the accompanying drawing showing a gassing chamber for use in the method.

FIGURE 1 is a side elevation of the chamber partly in a vertical section and
FIGURE 2 is a part horizontal section on the line II—II in FIGURE 1.

Referring to the drawing, both ends of the gassing chamber 1 are closed in an identical manner by means of parallel rubber bungs 2 fitting into tubular extensions 3 of the chamber, which are externally threaded. In addition to the bungs 2, metal thrust plates 4 provided with upper and lower lugs sliding in key-ways in the extensions 3 fit into the ends of the tubular extensions 3. The plates 4 can be forced into the tubular extensions 3 to compress the bungs 2 by means of knurled locking nuts 5. The rubber bungs 2 and plates 4 are each provided with parallel central bores 6 to receive the cable.

A shearing pin 7, grooved at 8 and 9 to receive sealing rings, fits into a transverse bore in the chamber 1 and is retained in the bore by a ring 10 and an integral end cap 11. The shearing pin 7 is formed with a tapering bore 12 (FIGURE 2) which by rotation of the pin 7 can be made co-axial with the bore 13 of the gassing chamber 1. At its upper end the shearing pin 7 is provided with a handle 14 by which it can be rotated with respect to the chamber 1.

The chamber is provided with an inlet aperture 15 into which a pipe for connection to a vacuum pump or gas supply can be sealed and the chamber is mounted on a bracket 16.

In carrying out the method in accordance with the invention the locking nuts 5 are slackened and a cable is inserted through the bores 6 in the metal plates 4 and the bungs 2 in such a way that is passes completely through the bore 13 of the chamber and through the tapering bore 12 of the shearing pin, which for this purpose is arranged with its axis coincident with the axis of the bore 13. The cable is pulled through the chamber until both of its ends are remote from the chamber. For example when the cable is a thermocouple cable of external diameter 0.040″ (1.0 mm.) we prefer that at least 2 inches (5 cm.) of the cable should project from each end of the chamber.

The locking nuts 5 are then tightened and the chamber evacuated to a pressure of 0.5 to 0.1 mm. of mercury. After about two minutes the cable is cut by rotating the shearing pin 7 by means of the handle 14, to the extent that one cut only is made in the cable, that is to say, the pin is rotated until its tapering bore is in the position relative to the bore 13 shown in FIGURE 2.

The vacuum in the chamber is broken by hydrogen at a pressure of 200–400 lbs. per square inch (14–28 kgs. per sq. cm.) and the pressure is maintained at this value for two minutes.

After slackening the locking nuts 5 the two portions of mineral insulated cable are withdrawn for the further processing involved in terminating the lengths or jointing them with other lengths of cable.

When the cable is a thermocouple cable of external diameter 0.040 inch (1.0 mm.) with a sheath wall thickness of .006 inch (0.025 mm.) and with two conductors of diameter .006 inch (0.25 mm.) insulated from each other and from the sheath by compacted magnesium oxide powder, the gas pressure and time referred to above allows approximately ten minutes for such processing before the gas pressure developed in the ends of the cable is dissipated but this time can be adjusted by changing the time and pressure of impregnation. We prefer however to use a pressure of at least 200 lbs. per sq. inch (14 kgs. per sq. cm.) and an impregnation time of at least 2 minutes. A simple test for sufficient impregnation of the insulation is to immerse the cut end of the cable in water and to observe the escaping gas bubbles.

In some cases when the end of the cable is to be sealed by welding it is necessary or advisable to evacuate the impregnated end of the cable before finally sealing this end, so as to avoid deformation of the sealed end by gas escaping from the insulation and collecting within the closure while a part of or the whole of the closure is in a molten or soft condition. We prefer in such cases to introduce the cut end into the welding chamber, evacuate the chamber and then break the vacuum with argon and proceed with the welding operation in the normal way. Such a welding process is used for example in sealing the hot end of a mineral insulated thermocouple cable.

The method in accordance with the invention is especially applicable to thermocouple cables having conductor pairs of high nickel alloys, for example nickel/chromium and nickel/aluminium alloys as defined in British standard specification 1827 and sold under the trade names T1, T2 and chromel/alumel. Conductors of these alloys, when exposed to the atmosphere even for a very short time and subsequently heated, for example during a welding operation or during E.M.F. calibration of a completed thermocouple cable, are liable to a form of deterioration that can be referred to as "embrittlement." This phenomenon is a form of attack penetrating from the outside surface of the metal for a short distance along the grain boundaries. The depth of penetration is usually limited and hence the method in accordance with the invention is especially applicable to cables with small diameter conductors, for example 0.040 inch (1.0 mm.) or less.

The effect of the attack, although usually not readily apparent in a polished section of the metal, can be demonstrated by the fact that it renders the grain boundary more susceptible to attack by etchants, in particular the etchant known as "Marbles Reagent" which consists of:

Anhydrous copper sulphate _____ grams__ 20
Hydrochloric acid, conc. _____ cc__ 100
Water _____ cc__ 100

After etching a section of the conductor with this reagent the affected portions of the grain boundaries appear broader and more heavily marked.

Although the method of the invention is especially applicable to the protection of thermocouple cables against such embrittlement under high temperature conditions, it is applicable to any jointing or terminating procedure for other mineral insulated cables where it is desirable to inhibit penetration of the atmosphere into freshly cut ends of the cable.

What we claim as our invention is:

1. A method of sealing the end of a mineral insulated cable for jointing and terminating the cable which comprises the steps in the following sequence of: temporarily sealing a length of the cable in a gas tight chamber; evacuating the chamber; cutting the cable within the chamber at a position where the insulation is judged to be uncontaminated by atmospheric moisture; filling the chamber with an inert gas at a pressure above that of any gas within the cable; maintaining the cut end in the chamber for a given time to expose the cut end to a pressure of the gas in the chamber such that upon removal of the cut end from the chamber, during at least part of the time after the cut end is removed from the chamber and before sealing the end of the cable, a local atmosphere of the gas escapes from the insulation to protect the cut end, removing the cut end from the chamber; cutting back the sheath; removing the insulation from the conductors and sealing the end of the cable.

2. A method as claimed in claim 1 in which a length of the cable is sealed through the chamber with both ends protruding from the chamber.

3. A method as claimed in claim 1 in which the pressure of inert gas in the chamber is raised to at least 200 lbs. per square inch and the cut end is exposed to the gas at said pressure for at least 10 minutes.

4. A method of sealing the end of a mineral insulated cable for jointing and terminating the cable which comprises the steps in the following sequence of: temporarily sealing a length of the cable in a gas tight chamber; filling the chamber with an inert gas at a pressure above that of any gas within the cable; cutting the cable within the chamber at a position where the insulation is judged to be uncontaminated by atmospheric moisture; maintaining the cut end in the chamber for a given time to expose the cut end to a pressure of the gas in the chamber such that upon removal of the cut end from the chamber, during at least part of the time after the cut end is removed from the chamber and before sealing the end of the cable, a local atmosphere of the gas escapes from the insulation to protect the cut end, removing the cut end from the chamber; cutting back the sheath; removing the insulation from the conductors and sealing the end of the cable.

5. A method as claimed in claim 4 in which a length of the cable is sealed through the chamber with both ends protruding from the chamber.

6. A method as claimed in claim 4 in which the pressure of inert gas in the chamber is raised to at least 200 lbs. per square inch and the cut end is exposed to the gas at said pressure for at least 10 minutes.

7. A method of forming and sealing a hot junction at the cut end of a mineral insulated thermocouple cable which comprises the steps of: sealing a length of the cable in a gas tight chamber; cutting the cable within the chamber at a position where the insulation is judged to be uncontaminated by atmospheric moisture; and, after the cable has been cut, exposing the cut end to an inert gas within the chamber under a pressure above that of any gas within the cable for a time such that upon the removal of the cut end from the chamber, during at least part of the time that the cut end is removed from the chamber and before sealing the cable, a local atmosphere of the gas escapes from the insulation to protect the cut end, removing the cut end from the chamber; removing insulation from the cut end of the cable to expose short lengths of the conductors; connecting the exposed conductors together; insulating the connection thus formed; and enclosing the insulated connection in an enclosure hermetically sealed to the cable sheath.

8. A method as claimed in claim 7 which comprises the steps of: jointing the cable conductors to form a hot junction while the cut end is protected from contact with the atmosphere by a local atmosphere of the gas escaping from the insulation; after the hot junction has been formed sealing the end of the cable in a welding chamber; evacuating the chamber; and thereafter performing a welding process by which the end of the cable sheath is sealed.

9. A method as claimed in claim 8 in which the cable is a thermocouple cable with a conductor pair of high nickel alloys.

10. A method as claimed in claim 9 in which the conductors of the pair are of a nickel/chromium and a nickel/aluminium alloy respectively.

11. A method as claimed in claim 10 in which the diameter of each conductor is not greater than .040 inch.

References Cited

UNITED STATES PATENTS 2,089,052   8/1937   Calvert _____ 156—49 X

FOREIGN PATENTS 958,159   5/1964   Great Britain.

JOHN F. CAMPBELL, Primary Examiner.
ROBERT W. CHURCH, Assistant Examiner

U.S. Cl. X.R.

29—494, 628; 83—169; 136—232; 156—49; 174—21, 25